Oct. 17, 1961 H. ZSCHAU 3,005,047

GAMMA CONTROL IN TELEVISING FILM

Original Filed June 8, 1954 2 Sheets-Sheet 1

*INVENTOR*
HORST ZSCHAU

*By*

MICHAEL S. STRIKER

*Attorney*

INVENTOR:
HORST ZSCHAU
BY
MICHAEL S. STRIKER
Attorney

United States Patent Office 3,005,047

Patented Oct. 17, 1961

3,005,047

GAMMA CONTROL IN TELEVISING FILM

Horst Zschau, Darmstadt, Germany, assignor to Fernseh G.m.b.H., Darmstadt, Germany Original application June 8, 1954, Ser. No. 435,235. Divided and this application Dec. 18, 1958, Ser. No. 781,341

Claims priority, application Germany June 9, 1953

10 Claims. (Cl. 178—7.2)

This invention relates to a method and apparatus for televising pictures and automatically controlling the amplification of television signals so as to improve the reproduction of the pictures.

The present application is a division of my copending application Serial No. 435,235, filed June 8, 1954, entitled "Method and Apparatus for Televising Pictures."

In the transmission of pictures and particularly moving picture films by television it is usually not possible to use a normal copy of a film, since the density or blackness of such film is too great. What is needed is a film which is flat, i.e. has a small range of densities, since a considerable increase in gradation results from the reproduction characteristic of the television picture tube. Television picture tubes are characterized by gamma values of 1.8 to 2. A contrast range of 1 to 10 is amplified by gamma equals 2 to a range of 1 to 100, while a range of 1 to 100 is amplified to 1 to 10000. A picture tube cannot reproduce such ranges of contrast and consequently a great deal of the detail of the picture is lost in reproduction.

For this reason it has been the practice to make special copies of moving picture films having density ranges considerably less than the theater copies of the films. The production of such special copies is expensive and requires much time, and also presumes that the negative is available and the legal right of reproduction has been cleared. Furthermore, in the production of the special copies one does not always succeed in maintaining the correct sensitometric values.

It has been the practice, therefore, to use so-called gamma control. For this purpose adjustments are made in the amplifying channel at the sending and corresponding to gamma values of 1 to 0.5. Theoretically, in a film scanner, a gamma value of 0.5 to 0.6 ought to suffice for the satisfactory reproduction of all films. However, changes in the transmission channel and unsatisfactory qualities of film copies require that the gamma values be set for each particular scene. This is done, for example, by watching the picture continuously and setting the desired gamma value by means of a dial as the film proceeds. This method has the disadvantage that only very well trained and attentive personnel can be employed. This method also has the further disadvantages that poor settings are unavoidable and that a certain time elapses, due to the reaction time of the operator or monitor, before the correct setting can be made. These adjustments must be made during transmission and, therefore, are visible at the receiver.

It is an object of the present invention to provide a method and apparatus for automatically controlling the gamma of television signals at the sending end of a television system and thereby overcome the prior art disadvantages and defects described above.

According to the invention there is provided for the transmission of pictures by television a picture record or a moving picture film strip having markings at places thereon not used for the picture. These markings correspond to a characteristic of the pictures, such as the contrast or density of the pictures. Means are provided for deriving control signals from these markings. A transmission channel for the television signals is then controlled so that its amplification varies in accordance with said control signals.

More particularly, according to the invention a moving picture film strip is provided with a magnetic sound track along one edge thereof and a second modulated magnetic track along its other edge. A cathode ray tube scanner projects a light beam through the film onto a photo-electric tube. The second magnetic track is scanned by a magnetic pick-up which derives control signals from said second magnetic track. The video signals from the output of the photo-electric tube are fed in parallel to a pair of amplifiers having different characteristic curves. The gain of at least one of these amplifiers is controlled by the control signals so that their combined outputs cause the gamma of the video signals to vary in a desired manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2, 3:
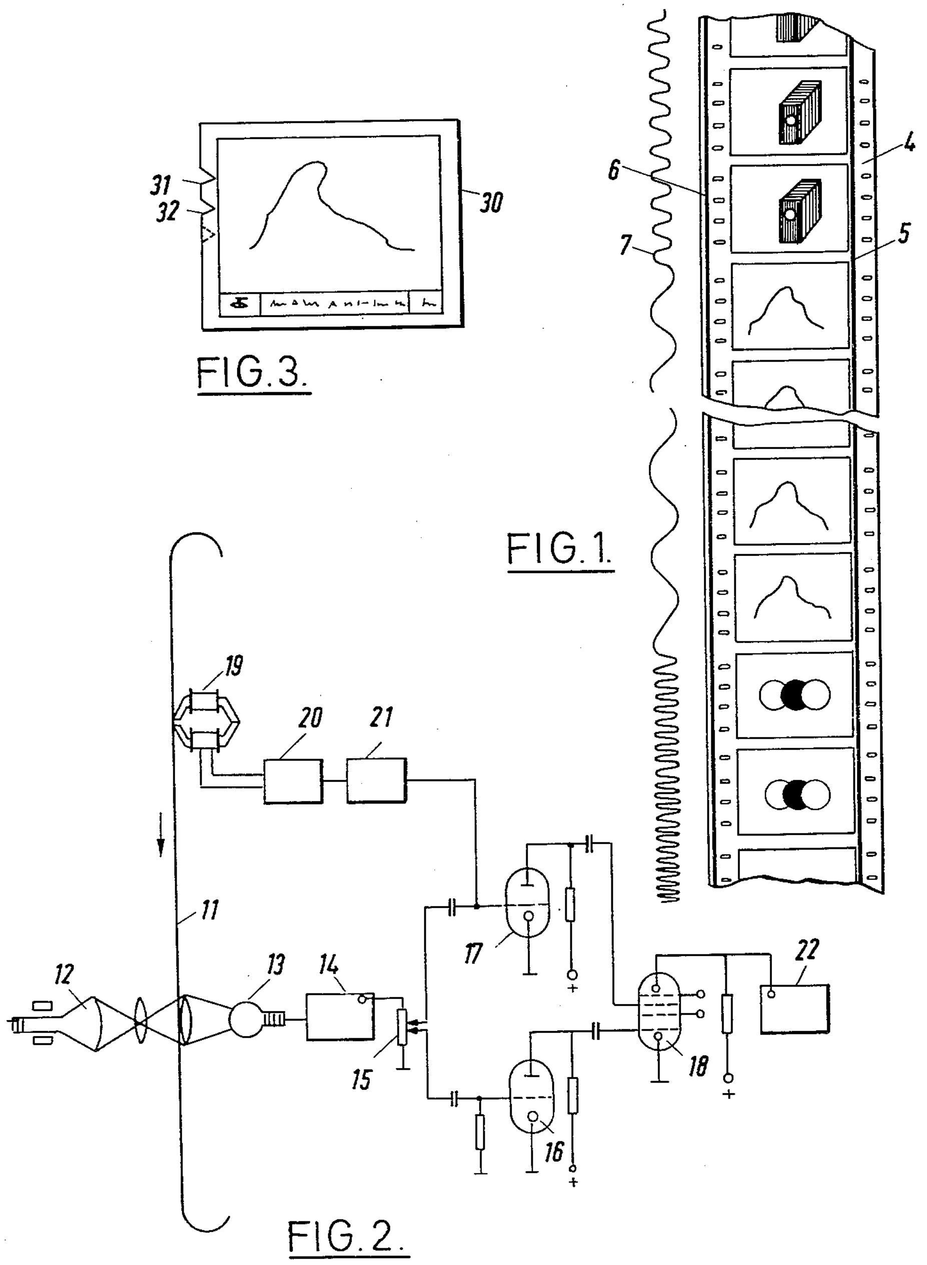
FIG. 1 is an illustration of a film strip and a diagrammatic indication of the modulation on one magnetic track thereof.
FIG. 2 is a schematic diagram of one embodiment of the invention.
FIG. 3 is a showing of a picture record having another type of control markings.

Referring now to FIG. 1 there is shown a picture record in the form of a film strip 4. Strip 4 contains a plurality of picture frames and a magnetic track 5 on which the sound signal is recorded. To insure even winding of the film strip 4 a second magnetic track 6 is placed on the opposite edge of the film strip. According to the invention a signal is modulated on the otherwise unused track 6. The modulation signal on track 6 is represented schematically by the curve 7 and shows a frequency change from the time of transmission of scene 1 to scene 2 and also from scene 2 to scene 3. The modulating signal 7 may exist for the duration of the entire scene or only at the beginning of each scene. In the latter case suitable means are provided to maintain the voltage represented by a given signal at a substantially constant value until the next signal occurs.

Referring to FIG. 2, the film strip 4 is scanned by a cathode ray tube 12. The light beam from the cathode ray tube 12 is projected through the film 4 unto a photo-electric tube 13, preferably of the type having secondary emission current multipliers. From the output of the photo tube 13 voltages corresponding to the brightness of the individual picture points are fed to an amplifier 14. In FIG. 2, a first means includes the cathode ray tube 12 and the photoelectric tube 13. A device such as a potentiometer 15 for tapping off different portions of the output of amplifier 14 is coupled to the control grids **16*a* and 17*a* of amplifiers 16 and 17 through condensers 16*b* and 17*b*. The outputs of amplifiers 16 and 17 are fed through coupling condensers 16*c* and 17*c* to the control grids 18*a* and 18*b* of an amplifier 18 which is in turn connected to suitable output circuits 22**. For the sake of simplicity biasing circuits and other circuit details not essential to an understanding of the invention are omitted.

In order to obtain the control signals from the film strip 4 a magnetic pick-up head 19 is provided. The magnetic pick-up 19 is connected to a frequency discriminator 20, the output of which is a varying voltage corresponding to the modulation 7 on the magnetic track 6. A second means includes the pick-up head 19 and the frequency discriminator 20. The output of the discriminator is amplified by a variable gain amplifier 21 and then fed to the control grid 17*a* of amplifier 17 to vary the bias on said grid. If the control signals are recorded so that they occur only at the beginning of each picture or scene amplifier 21 may be arranged to hold the voltage produced by each control signal at a substantially constant value until the next signal occurs. A third means includes the amplifiers 16, 17 and 18.

The amplifiers 16 and 17 preferably have different operating curves, consequently the signals are differently amplified by these two amplifiers. By adjusting the ratio of the amplitudes of the video signals fed to the grids 16*a* and 17*a*, which adjustment can be made by shifting the taps on potentiometer 15, any desired composite operating curve and, thereby, any desired gamma can be established. The gamma value thus set in, once a given adjustment has been made, can be changed only by changing the bias on the grid 17*a*. Accordingly, a variation of gamma is produced corresponding to the modulation 7. The modulation 7 may have a magnitude such that the maximum amplitude of the television signals is held at some constant value regardless of the contrast range of the picture.

It is possible to control the gamma also by other means, as, for example, by a feedback connection to the scanning tube to control the intensity of the scanning beam.

The present invention is useful also in the field of color television. In the scanning of color pictures the separate color signals are not reproduced with an amplitude such that a true picture of the original is produced in the receiver. In order to regulate the amplification of the color signals to the desired value, in accordance with the invention, special markings can be made which influence the amplification of the various color channels differently, each of which color channels may be similar to the apparatus shown in FIG. 2. In addition to the differential control of the amplification of the color channels the gamma value of each channel can be adjusted to yield a gamma value of 1 for the entire transmission system, including the reproduction apparatus.

By using a different kind of markings, the amplitude range of the amplifier may be regulated by electrical switching means to control the gamma. This type of control is of advantage where the film consists of several strips and it is desired to get better gradation of the dark places in one strip and in the light places in another strip.

Referring to FIG. 3 there is shown another picture record according to the invention wherein the border of the picture 30 is provided with triangular notches 31 and 32. These notches may, either by their depth of their number, represent the change in the value of gamma which it is desired to introduce in the video signals. It will be apparent that the notches may be sensed by any suitable known means such as contact levers adapted to produce voltage variations. It will be apparent that the control signal markings can be of many other forms, such as holes, metal markers, opaque marks etc. and can be scanned mechanically, optically, or pneumatically as well as magnetically.

Figure 4:
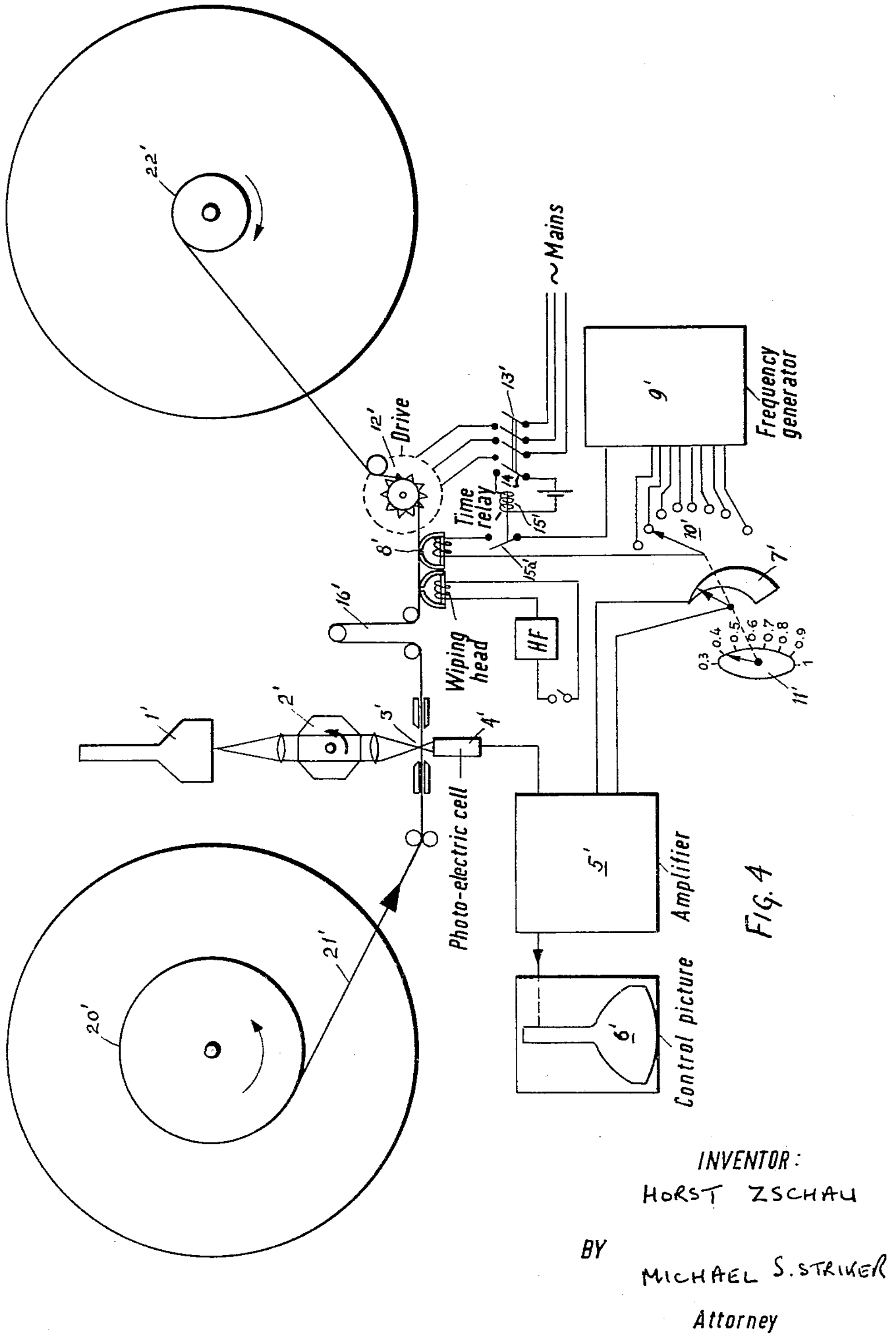
FIG. 4 is a diagrammatic schematic illustration of an editing table shown in conjunction with conventional electronic apparatus.

Referring to FIG. 4 which is a diagrammatic schematic illustration of an editing table, the film to be edited is mounted on the reel 20′ which may be rotated in the direction of the arrow so that the film 21′ is wound upon a take-up reel 22′. Instead of the usual optical projection device, a device substantially equivalent of a television pick-up tube may be used.

The pick-up tube 1′ is a flying spot scanner which generates a flying spot and applies the same through an optical system 2′ to the picture frame 3′ of the film strip 21′ being edited. Placed adjacent the frame 3′ is a photomultiplier tube 4′ which generates an electrical signal proportional to the intensity of the light reaching the same. Since the intensity of the light reaching the photomutliplier 4′ is dependent upon the density of the picture frame 3′, it can be seen that the electrical signal generated by the photomultiplier 4′ is substantially inversely proportional to the density of the film.

The output signal of the photomuliplier tube 4′ is amplified by an amplifier 5′ and applied to a cathode ray tube 6′. It is clear that the cathode ray tube 6′ represents a conventional monitoring device which reproduces the picture as it would appear in the television receiver. Such a device is used in all transmitting stations.

Also included on the editing table is a motor drive unit 12′ which may be energized by the line power supply through a switch 13′. A time delay relay 15′, when operated attracts its armature 15*a*′ to connect the frequency generator 9′ to the recording head 8′. The recording head 8′ is connected to the movable contact of a stepping switch 10′ which has a plurality of fixed contacts, each of which is connected to a different frequency output of the frequency generator 9′. Mechanically linked with the movable contact of the stepping switch 10′ is the movable contact of a variable rheostat 7′ which controls the gain of the amplifier 5′. An indexing dial 11′, which may be directly calibrated in the gamma number, may also be mechanically linked to the movable contacts of the rheostat 7′ and the switch 10′.

Accordingly, in operation the editor at the editing table checks the picture appearing on the monitor 6′ and varies the gain of the amplifier 5′ to provide the proper gradation of the picture. He then closes the switch 13′ which energizes the motor 12′ and winds the film up on the take-up reel 22′. A contact 14′ connected to the switch 13′ closes the time delay relay 15′ so that after a predetermined time delay the armature 15*a*′ will be directed towards its mating contact to connect the recording head 8′ to the frequency generator. It is apparent that the speed at which the motor drive moves the film can be so controlled that the picture which is seen by the editor reaches the recording head just when the time delay relay armature 15*a*′ closes. Accordingly, the desired frequency output of the frequency generator 9′ will be recorded on the magnetic track adjacent the proper picture frame in accordance with the density of the picture.

In FIG. 4 an erasing head is also shown which can be used if desired for correction purposes.

The apparatus of the attached FIG. 4 accordingly automatically applies the proper frequency to the magnetic track adjacent the picture frame in accordance with the density of the picture. As indicated hereinabove, however, it is not necessary to use such a complicated apparatus and the editor may carry this out in any one of a number of ways. This forms no part of the present invention which deals with the utilization of such recorded frequencies for the automatic control of apparatus in the transmitter station to provide the proper gamma correction.

In other words, it is not material exactly how the film is nicked or marked mechanically or exactly how the recorded modulations have been placed on the unused magnetic track. Once the film is obtained, a person skilled in the art can use the apparatus of FIG. 2 for deriving control voltages for automatically correcting the gradations in the film as it appears on the television receiver.

It will be understood that each of the elements described above, or two or more together, may also find a useful application in other types of television scanning systems differing from the types described above.

While the invention has been illustrated and described as embodied in a film scanning television system having automatic gamma control of the video signals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Television apparatus for reproducing scenes from moving picture records carrying an auxiliary record of control signals representing values respectively characteristic of the contrast of a particular scene record associated with said control signals, comprising first means including scanning means for scanning a record of a picture and video signal means for producing a series of electrical video signals in accordance with the light video pulses furnished by said scanning means, second means for deriving control signals from said record of control signals and for injecting the same into said video signal means and third means connected to said first and second means for adjusting the gamma applied during transmission to said video signals to a predetermined value by adjusting the transfer characteristic of the video signal means by said control signals.

2. Television apparatus for reproducing scenes from moving picture records carrying an auxiliary record of control signals representing values respectively characteristic of the contrast of a particular scene record associated with said control signals, comprising first means including scanning means for scanning a record of a picture and video signal means for producing a series of electrical video signals in accordance with the video pulses furnished by said scanning means, second means for deriving control signals from said record of control signals and for injecting the same into said video signal means and third means connected to said first and second means for amplifying said video signals by adjusting the transfer characteristic of the video signal means by said control signals so as to change the gamma applied during transmission to said video signals to a predetermined value.

3. Television apparatus for reproducing scenes from moving picture records carrying an auxiliary record of control signals representing values respectively characteristic of the contrast of a particular scene record associated with said control signals, comprising first means including scanning means for scanning a moving picture film strip and video signal means for producing a series of electrical video signals in accordance with the video pulses furnished by said scanning means and representing respectively consecutive pictures from a series of pictures on the film strip, second means for deriving control signals from said auxiliary record respectively corresponding to related series of said video signals from said film strip, and for injecting said control signals into said video signal means and third means connected to said first and second means for adjusting the gamma applied during transmission to said series of the video signals to a predetermined value by adjusting the transfer characteristic of the video signal means by the corresponding control signals.

4. Television apparatus for reproducing scenes from moving picture records carrying an auxiliary record of control signals representing values respectively characteristic of the contrast of a particular scene record associated with said control signals, comprising first means including scanning means for scanning a record of a picture and video signal means for producing a series of electrical video signals in accordance with the video pulses furnished by said scanning means and for amplifying the same, second means for deriving control signals from said record of control signals and for injecting the same into said video signal means, and third means connected to said first and second means for adjusting the amplification of said video signals by adjusting the transfer characteristic of the video signal means by said control signals and for maintaining the amplification substantially constant between successive values of the control signals.

5. Television apparatus for reproducing scenes from moving picture records carrying an auxiliary record of control signals representing values respectively characteristic of the contrast of a particular scene record associated with said control signals, comprising first means including scanning means for scanning a record of a picture and video signal means for producing a series of electrical video signals in accordance with the video pulses furnished by said scanning means and for amplifying the same, second means for deriving control signals from said record of control signals and for injecting the same into said video signal means and third means connected to said first and second means for adjusting the amplification of said video signals by adjusting the transfer characteristic of the video signal means by said control signals in such a manner that the maximum amplitude of said video signals is limited to a predetermined constant value.

6. Television apparatus for reproducing scenes form moving picture records carrying an auxiliary record of control signals representing values respectively characteristic of the contrast of a particular scene record associated with said control signals, comprising first means including scanning means for scanning a record of a picture and video signal means for producing a series of electrical video signals in accordance with the video pulses furnished by said scanning means and for amplifying the same, second means for deriving control signals from said record of control signals and for injecting the same into said video signal means, and third means connected to said first and second means for adjusting the amplification of said video signals by adjusting the transfer characteristic of the video signal means by said control signals in such a manner that the maximum amplitude of said video signals is limited to a predetermined constant value and for maintaining the amplification substantially constant between successive values of the control signals.

7. Television apparatus for reproducing scenes from moving picture records carrying an auxiliary record of control signals representing values respectively characteristic of the contrast of a particular scene record associated with said control signals, comprising first means including a cathode ray tube scanner for scanning a moving picture film strip having a magnetic track of control signals along one edge thereof, and an electron-multiplier photoelectric tube juxtaposed to said scanner for producing video signals in accordance with the video pulses furnished by said scanner, second means including a magnetic pickup and a frequency discriminator for deriving control signals from said magnetic track of control signals, and third means connected to said first and second means for adjusting the gamma applied during transmission to said video signals to a predetermined value and for utilizing said control signals to adjust during transmission the gamma applied to said video signals.

8. Television apparatus for reproducing scenes from moving picture records carrying an auxiliary record of control signals representing values respectively characteristic of the contrast of a particular scene record associated with said control signals, comprising first means including a cathode ray tube scanner for scanning a moving picture film strip having a magnetic track of control signals along one edge thereof and an electron-multiplier photo-electric tube juxtaposed to said scanner for producing video signals in accordance with the video pulses furnished by said scanner; second means including a magnetic pick-up and a frequency discriminator for deriving control signals from said magnetic track of control signals, and third means connected to said first and second means for adjusting the gamma applied during transmission to said video signals to a predetermined value and for utilizing the control signals to adjust during transmission the gamma applied to said video signals, said third means comprising a first amplifier and a second amplifier each having a control grid coupled to the output of said photoelectric tube, means connected with said frequency discriminator for impressing said control signals on the control grid of one of said amplifiers to adjust its gain, and means for combining the outputs of said amplifiers.

9. Television apparatus for reproducing scenes from moving picture records carrying an auxiliary record of control signals representing values respectively characteristic of the contrast of a particular scene record associated with said control signals, comprising first means including a cathode ray tube scanner for scanning a moving picture film strip having a magnetic track of control signals along one edge thereof, and an electron-multiplier photo-electric tube juxtaposed to the scanner for producing video signals in accordance with the video pulses furnished by said scanner, second means including a magnetic pick-up and a frequency discriminator for deriving control signals from said magnetic track of control signals, and third means for adjusting the gamma applied during transmission to said video signals to a predetermined value and for utilizing the control signals to adjust during transmission the gamma applied to said video signals, said third means being connected to said first and second means and comprising a first amplifier and a second amplifier each having a control grid coupled to the output of said photo-electric tube, means connected with said frequency discriminator for impressing said control signals on the control grid of one of said amplifiers to adjust its gain, and means for combining the outputs of said amplifiers including an electron tube amplifier having a pair of control grids, one of which is connected to the output of said first amplifier and the second of which is connected to said second amplifier.

10. Television apparatus for reproducing scenes from moving picture records carrying an auxiliary record of control signals representing values respectively characteristic of the contrast of a particular scene record associated with said control signals, comprising, in combination, a moving picture film strip having a magnetic sound track along one edge thereof and a second magnetic track of control signals along the other edge thereof, first means including a cathode ray tube scanner for scanning the film strip and an electron-multiplier photoelectric tube juxtaposed to the scanner for producing video signals in accordance with the video pulses furnished by said scanner, second means including a magnetic pick-up and a frequency discriminator for deriving control signals from said second magnetic track, and third means connected to said first and second means for adjusting the gamma applied during transmission to said video signals to a predetermined value and for utilizing said control signals to adjust during transmission the gamma applied to said video signals.

References Cited in the file of this patent

UNITED STATES PATENTS

| | | |
|---|---|---|
| 2,818,466 | Larson | Dec. 31, 1957 |

FOREIGN PATENTS

| | | |
|---|---|---|
| 729,541 | Great Britain | May 11, 1955 |
| 732,867 | Great Britain | June 29, 1955 |
| 1,047,043 | France | Dec. 10, 1953 |